US008104688B2

(12) United States Patent
Wallace et al.

(10) Patent No.: US 8,104,688 B2
(45) Date of Patent: Jan. 31, 2012

(54) METHOD AND SYSTEM FOR IDENTIFYING A GAME PIECE

(76) Inventors: Michael Wallace, Vancouver, WA (US); Philip Trevor Odom, Portland, OR (US)

( * ) Notice: Subject to any disclaimer, the term of this patent is extended or adjusted under 35 U.S.C. 154(b) by 368 days.

(21) Appl. No.: 12/485,010

(22) Filed: Jun. 15, 2009

(65) Prior Publication Data
US 2009/0309303 A1    Dec. 17, 2009

Related U.S. Application Data

(60) Provisional application No. 61/132,620, filed on Jun. 20, 2008, provisional application No. 61/132,330, filed on Jun. 16, 2008, provisional application No. 61/132,235, filed on Jun. 16, 2008, provisional application No. 61/132,237, filed on Jun. 16, 2008, provisional application No. 61/132,238, filed on Jun. 16, 2008.

(51) Int. Cl.
| | |
|---|---|
| *G06K 19/00* | (2006.01) |
| *G06K 7/08* | (2006.01) |
| *G06K 7/00* | (2006.01) |
| *A63F 3/00* | (2006.01) |

(52) U.S. Cl. ........ 235/487; 235/451; 235/435; 273/236; 273/237; 273/238

(58) Field of Classification Search .......... 273/236–239; 235/487, 492, 435, 451
See application file for complete search history.

(56) References Cited

U.S. PATENT DOCUMENTS

| | | | | |
|---|---|---|---|---|
| 3,827,692 A | * | 8/1974 | Morrison et al. | 273/108.56 |
| 3,953,932 A | * | 5/1976 | Graves | 40/27.5 |
| 4,389,564 A | * | 6/1983 | Flair et al. | 235/489 |
| 4,435,911 A | * | 3/1984 | Jones | 40/27.5 |
| RE32,837 E | * | 1/1989 | Corni | 235/375 |
| 4,814,589 A | * | 3/1989 | Storch et al. | 235/375 |
| 5,103,081 A | * | 4/1992 | Fisher et al. | 235/462.03 |
| 5,159,181 A | * | 10/1992 | Bartels et al. | 235/441 |
| 5,166,502 A | * | 11/1992 | Rendleman et al. | 235/492 |
| 5,190,285 A | * | 3/1993 | Levy et al. | 463/36 |
| 5,283,422 A | * | 2/1994 | Storch et al. | 235/375 |
| 5,406,264 A | * | 4/1995 | Plonsky et al. | 235/493 |
| 5,831,527 A | * | 11/1998 | Jones et al. | 340/540 |
| 5,895,321 A | * | 4/1999 | Gassies et al. | 463/29 |
| 5,919,090 A | * | 7/1999 | Mothwurf | 463/25 |
| 6,154,131 A | * | 11/2000 | Jones et al. | 340/540 |
| 6,254,002 B1 | * | 7/2001 | Litman | 235/450 |
| 6,264,109 B1 | * | 7/2001 | Chapet et al. | 235/492 |
| 6,276,608 B1 | * | 8/2001 | Cockayne et al. | 235/492 |
| 6,488,210 B2 | * | 12/2002 | Schumi et al. | 235/488 |
| 6,527,181 B1 | * | 3/2003 | Kleeberg et al. | 235/462.03 |
| 6,641,483 B1 | * | 11/2003 | Luciano et al. | 463/46 |
| 6,724,198 B2 | * | 4/2004 | Hohl | 324/654 |
| 6,724,429 B2 | * | 4/2004 | Shore et al. | 348/373 |
| 6,835,131 B1 | * | 12/2004 | White et al. | 463/1 |
| 7,614,545 B2 | * | 11/2009 | Christoffersen et al. | 235/375 |
| 7,862,434 B2 | * | 1/2011 | Miller et al. | 463/43 |
| 7,938,722 B2 | * | 5/2011 | Rowe et al. | 463/29 |
| 2002/0042298 A1 | * | 4/2002 | Soltys et al. | 463/29 |
| 2002/0068625 A1 | * | 6/2002 | Soltys et al. | 463/29 |

(Continued)

*Primary Examiner* — Daniel Walsh

(74) *Attorney, Agent, or Firm* — Rylander & Associates, PC; Kurt Rylander; Philip R. M. Hunt

(57) ABSTRACT

A method and system for determining the presence and identity of a game piece placed at a sensing location by attaching one or more conductive rings at fixed concentric locations on the bottom of the game piece and sensing the presence or absence of the conductive rings by means of sensors that are insensitive to the rotational orientation of the game piece.

9 Claims, 7 Drawing Sheets

U.S. PATENT DOCUMENTS

| | | |
|---|---|---|
| 2002/0079908 A1* | 6/2002 | Hohl .......................... 324/654 |
| 2002/0096567 A1* | 7/2002 | Schumi et al. ............... 235/487 |
| 2002/0151352 A1* | 10/2002 | Mothwurf ....................... 463/25 |
| 2003/0174864 A1* | 9/2003 | Lindquist ....................... 382/100 |
| 2004/0159707 A1* | 8/2004 | Liu et al. ....................... 235/487 |
| 2004/0218518 A1* | 11/2004 | Liu et al. ....................... 369/292 |
| 2005/0059479 A1* | 3/2005 | Soltys et al. ................... 463/25 |
| 2005/0258598 A1* | 11/2005 | Myrfors et al. ............... 273/288 |
| 2006/0012580 A1* | 1/2006 | Perski et al. .................. 345/173 |
| 2006/0039246 A1* | 2/2006 | King et al. .................. 369/30.01 |
| 2006/0063586 A1* | 3/2006 | Krenn et al. ................... 463/25 |
| 2006/0154731 A1* | 7/2006 | Koyama et al. ............... 463/43 |
| 2006/0205484 A1* | 9/2006 | Nicastro ....................... 463/25 |
| 2006/0250244 A1* | 11/2006 | Tsen et al. ................. 340/572.1 |
| 2007/0021171 A1* | 1/2007 | Pavlovich et al. ............. 463/16 |
| 2007/0062852 A1* | 3/2007 | Zachut et al. ................ 209/683 |
| 2007/0102876 A1* | 5/2007 | Giegerich et al. .......... 273/108.1 |
| 2007/0105616 A1* | 5/2007 | Chapet et al. .................. 463/25 |
| 2007/0184898 A1* | 8/2007 | Miller et al. .................... 463/29 |
| 2007/0251999 A1* | 11/2007 | Bohlke et al. ................ 235/380 |
| 2008/0076536 A1* | 3/2008 | Shayesteh ....................... 463/25 |
| 2009/0075723 A1* | 3/2009 | Richard et al. ................. 463/25 |
| 2009/0075725 A1* | 3/2009 | Koyama ......................... 463/25 |
| 2009/0093293 A1* | 4/2009 | Koyama et al. ................ 463/17 |
| 2009/0170595 A1* | 7/2009 | Walker ............................ 463/25 |
| 2009/0266173 A1* | 10/2009 | Kobayashi et al. ............. 73/724 |
| 2009/0309303 A1* | 12/2009 | Wallace et al. ............... 273/237 |
| 2009/0315258 A1* | 12/2009 | Wallace et al. ............... 273/238 |
| 2010/0024546 A1* | 2/2010 | Challoner et al. ......... 73/504.08 |
| 2010/0050197 A1* | 2/2010 | Griffin et al. .................. 720/745 |
| 2011/0018715 A1* | 1/2011 | Lee ............................ 340/572.7 |

* cited by examiner

METHOD AND SYSTEM FOR IDENTIFYING A GAME PIECE

CROSS-REFERENCE TO RELATED APPLICATION

This application claims priority to U.S. Provisional Patent Application Ser. No. 61/132,620, "Interactive Game System Incorporating Capacitive Sensing and Identification" filed Jun. 20, 2008, U.S. Provisional Patent Application Ser. No. 61/132,330, "Method and System for Capacitive Sensing Using a Dual-Mode Interdigitated Sensor" filed Jun. 16, 2008, U.S. Provisional Patent Application Ser. No. 61/132,235, "Game System Incorporating Capacitive Sensing" filed Jun. 16, 2008, U.S. Provisional Patent Application Ser. No. 61/132,237, "Method and System for Encoding Data, and for Reading Encoded Data" filed Jun. 16, 2009, and U.S. Provisional Patent Application Ser. No. 61/132,238, "Method and System for Identifying a Game Piece" filed Jun. 16, 2008, each of which is herein incorporated by reference.

FIELD OF THE INVENTION

The present invention relates to the use of multiple sensing structures to sense coded indicia on an object.

BACKGROUND

Games involving electrical and electronic components are becoming commonplace. Many traditional board games can be realized in electronic form, with some of the features of the game implemented by electronic circuitry rather than by human action. A useful feature for such games is the detection of the position and identity of a game piece upon the game board. For example, U.S. Pat. No. 5,129,654 by Bogner describes an electronic game apparatus where the presence and identity of game pieces is detected by two intersecting series of transmission lines, which transmit different frequencies that excite resonant circuits held within each game piece, the circuit for each piece having a distinct resonant frequency which uniquely identifies the game piece. Similarly, U.S. Pat. No. 5,853,327 by Gilboa describes a system in which each game piece contains a transponder which is responsive to an electromagnetic query signal, and a plurality of sensors that respond to answer signals generated by a game piece and thereby determine the location and identity of a game piece. In still another example from the prior art, U.S. Pat. No. 6,168,158 by Bulsink describes a system that incorporates resonance coils within each game piece such that the electrical and magnetic properties of each resonance coil is indicative of the type of game piece, and a game board equipped with a series of transmit and receive coils such that each playing square has a unique pair of transmit and receive coils under it. In each of these systems, the presence of a game piece of a particular identity at a particular position can be used to control the behavior of the game.

In the above systems described in the prior art, each game piece in a game must be equipped with complex circuitry that responds to outside stimuli, and the game board must be equipped with a plurality of sensors and a complex driving and sensing control circuit to accomplish the task of identifying the location and identity of a piece. These factors make such systems too expensive for simple board games, and therefore limit their practicality.

Simpler systems have been described for determining the identity of an article by sensing indicia on the article. For example, U.S. Pat. No. 4,355,300 by Weber describes a system in which a series of sensing elements reads conductive indicia in fixed positions upon a substrate, each sensing position signaling the presence or absence of an indicium and the resulting binary bits forming a complete code value. The system of Weber has the advantage of being simple and inexpensive, but requires that the object to be identified be placed at a particular location and in a particular orientation to facilitate the identification. These latter requirements are impractical in a children's game, where object placement is often haphazard, and object orientation may not be readily apparent.

The teachings of each of the above-listed citations (which do not incorporate essential material by reference) are herein incorporated by reference. None of the above inventions and patents, taken either singularly or in combination, is seen to describe the instant invention.

What is required is a system that utilizes simple indicia on a game piece in conjunction with a simple sensing circuit to determine the location and identity of the game piece within the playing area of a game.

SUMMARY AND ADVANTAGES

A method and system for encoding identifying indicia on a game piece and unambiguously determining the identity of a game piece placed upon a sensing location, regardless of the rotational orientation of the game piece on the sensing location.

In one embodiment of the invention, the indicia are rings of conductive material of fixed width and of a plurality of diameters emplaced concentrically on the bottom of a game piece, the number and diameter of the rings being representative of a code identifying the type of the game piece, said indicia being sensed by capacitive sensors arranged in corresponding concentric regions within a circular sensing area, whereby the response of the sensors to the presence of the conductive rings is independent of the rotational orientation of the game piece.

In an alternative embodiment of the invention, the indicia are rings of conductive material of a plurality of widths and of a plurality of diameters emplaced concentrically on the bottom of a game piece, the number, width, and diameter of the rings being representative of a code identifying the type of the game piece, said indicia being sensed by capacitive sensors arranged in corresponding concentric regions within a circular sensing area, whereby the response of the sensors to the conductive rings is dependent on the presence and width of a ring but is independent of the rotational orientation of the game piece.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
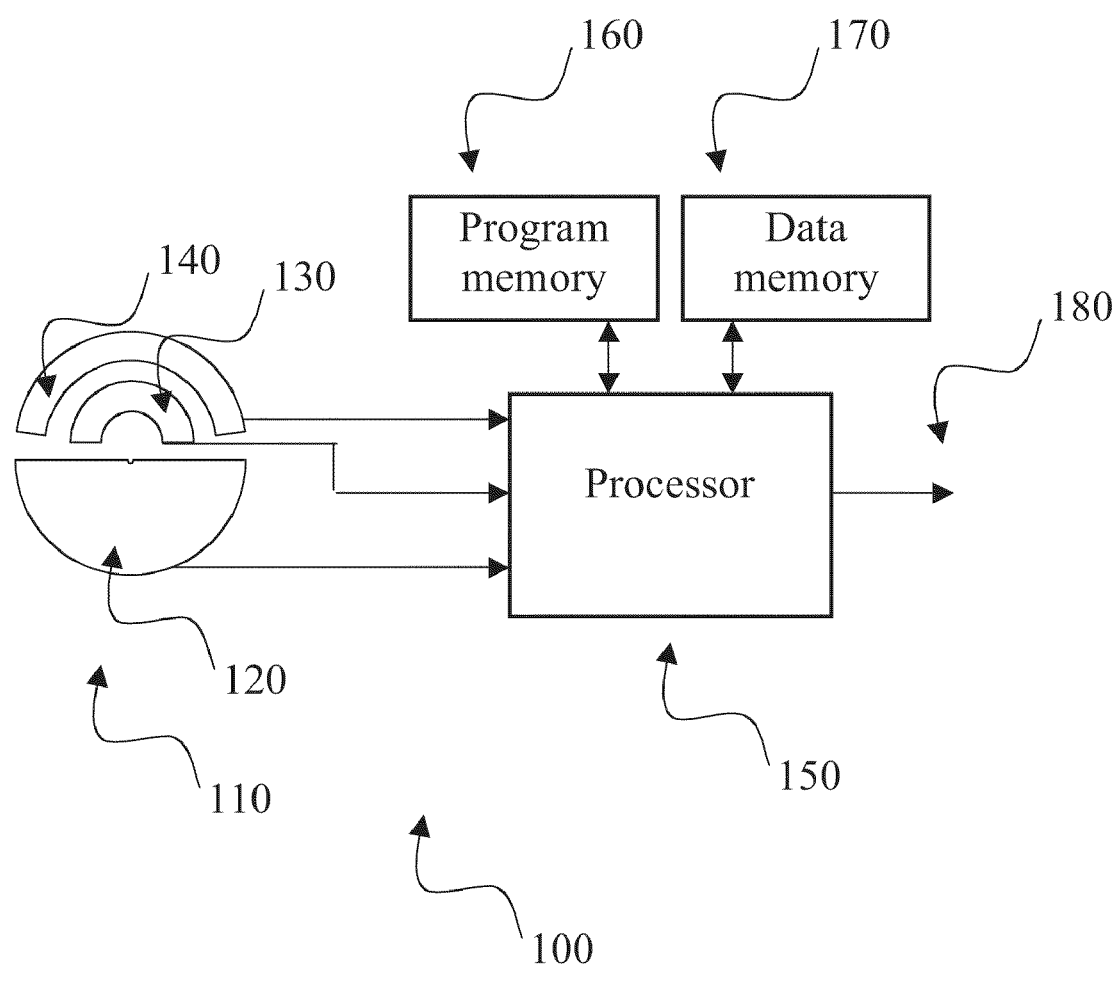
FIG. 1 depicts a system embodying the features of this invention.

FIG. 1. depicts the component parts of an exemplary system 100 for reading an encoded value using the method of the current invention. A sensor assembly 110 is connected to a processor 150, which also connects to a program memory 160 and a data memory 170. The sensor assembly 110 comprises a multiplicity of sensor elements including a conductive reference element 120 which is preferentially a half disk, and a plurality of conductive sensor elements 130, 140 which are preferentially arcuate segments disposed so that the axis of half-disk sensor element 120 is coincident with the axis of arcuate segments 130, 140. Each of the elements 120, 130, 140 of sensor assembly 110 is electrically connected to processor 150. Under control of program instructions stored in program memory 160, processor 150 reads sensors elements 130, 140 in sequence, in each case reading the capacitance between the sensor element and the reference element 120. Processor 150 converts the sensor readings, using calibration data stored in data memory 140, into an identity value that is reported to an external device through communication channel 150. One skilled in the art will recognize that program memory 160 and data memory 170 can be any type of memory including solid state, optical, magnetic, or other memory means; furthermore, program memory 160 and data memory 170 could be logical divisions of physical memory locating within a single memory system. In the exemplary system two sensor elements are depicted, however, three or more sensor elements may be included in sensor assembly 110 to allow decoding of a greater number of combinations of indicia.

Figure 2:
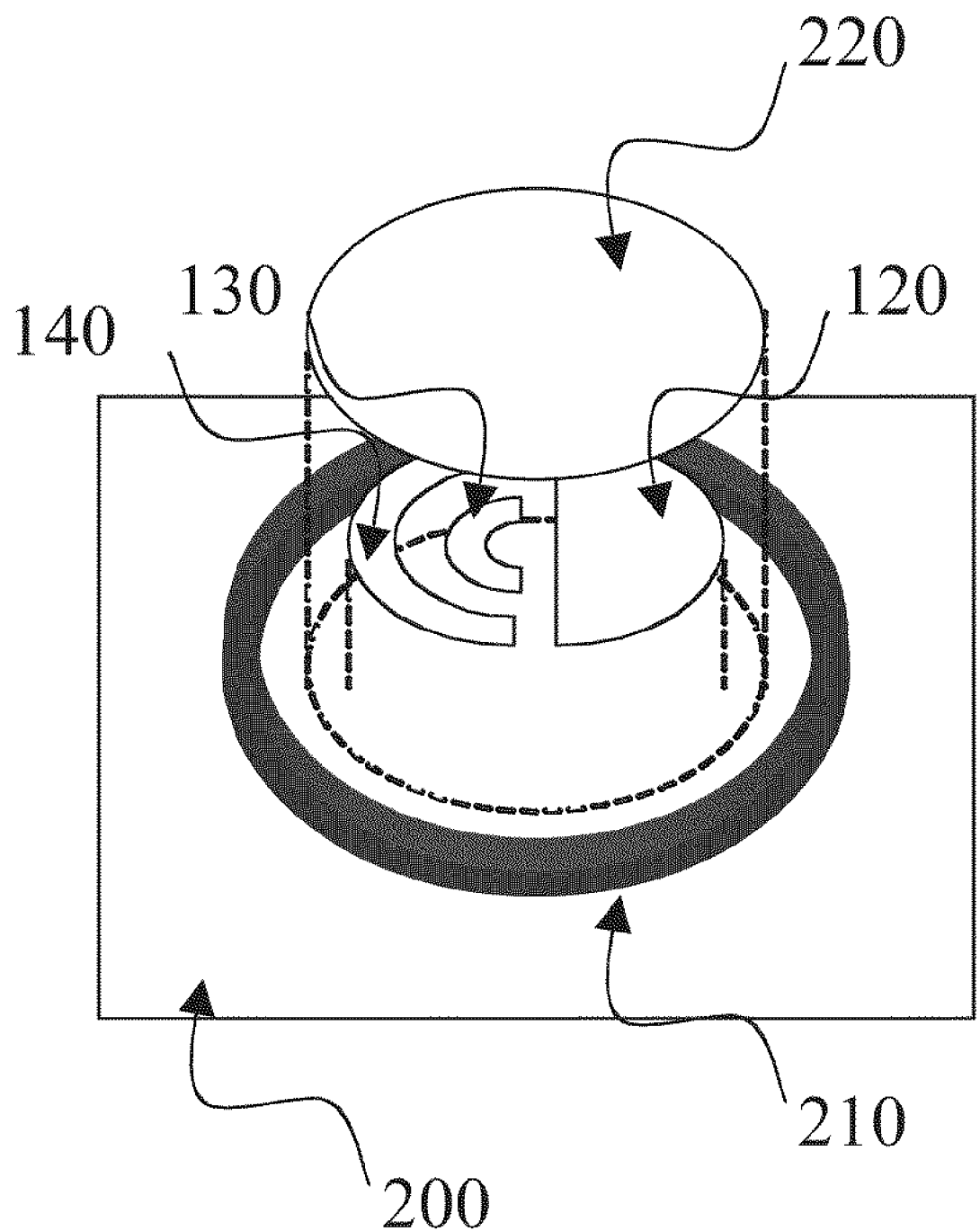
FIG. 2 shows an exemplary method of constructing a sensor for use with this invention.

FIG. 2 shows in perspective view the assembly of the components of a sensor assembly onto a non-conductive substrate 200. Within a circular raised ring 210 on the substrate 200, the conductive reference element 120 and conductive sensor elements 130, 140 are disposed so that the axes of reference element 120 and sensor elements 130, 140 are coincident with the axis of circular raised ring 210. A non-conductive shield 220 is placed over the elements 120, 130, 140, within the raised ring 210. For clarity, the electrical connections of elements 120, 130, 140 are not shown.

Figure 3:
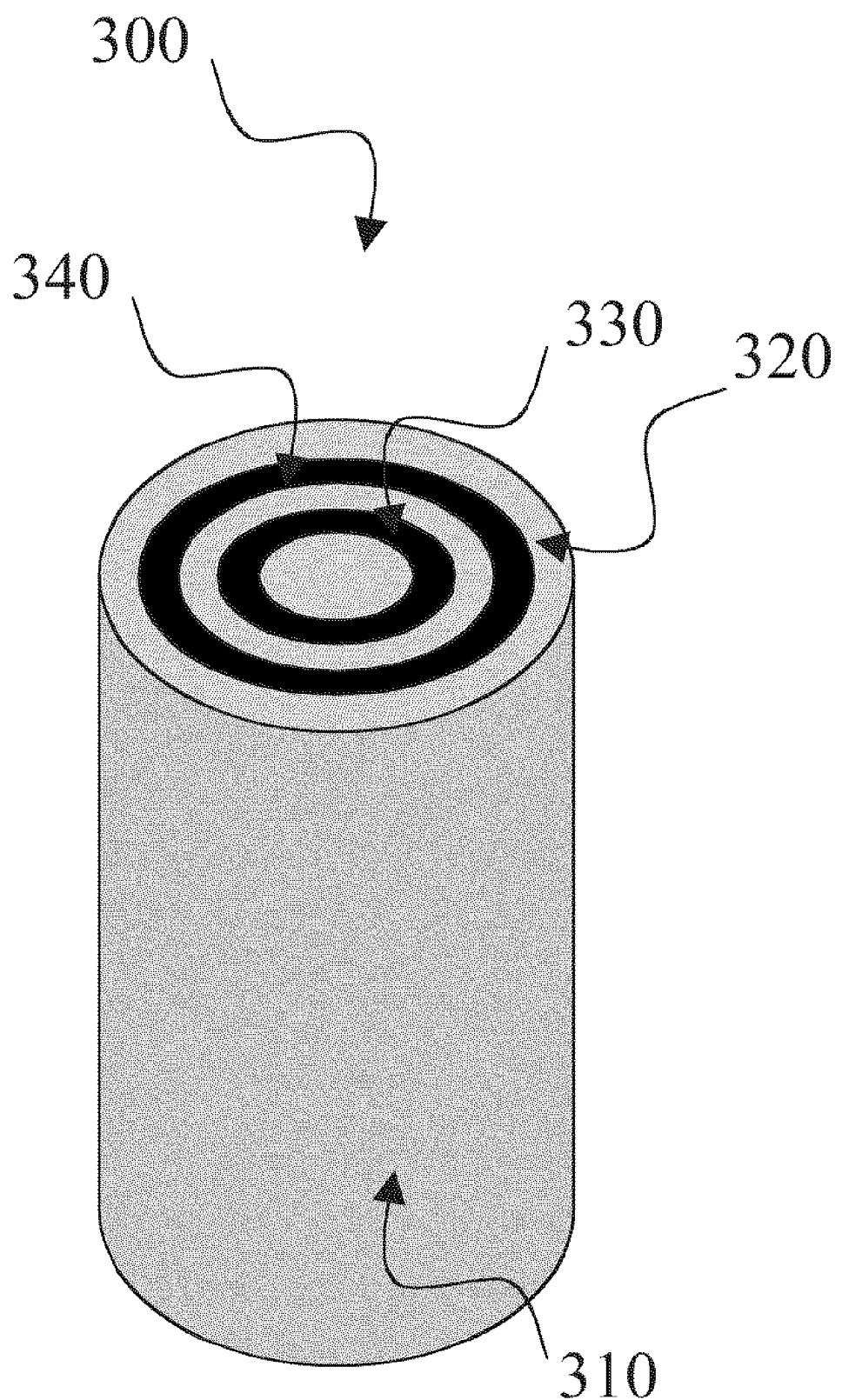
FIG. 3 shows a game piece configured for use with this invention.

FIG. 3 depicts an exemplary game piece for use with system 100. The game piece 300, depicted in an inverted position, comprises a non-conductive body 310 with a flat bottom surface 320 upon which are arranged conductive indicia in a multiplicity of fixed positions 330, 340. Indicia may be emplaced at some or all of the multiplicity of fixed positions 330, 340, whereby the number and placement of the indicia uniquely encodes the identity of the game piece.

Figure 4:
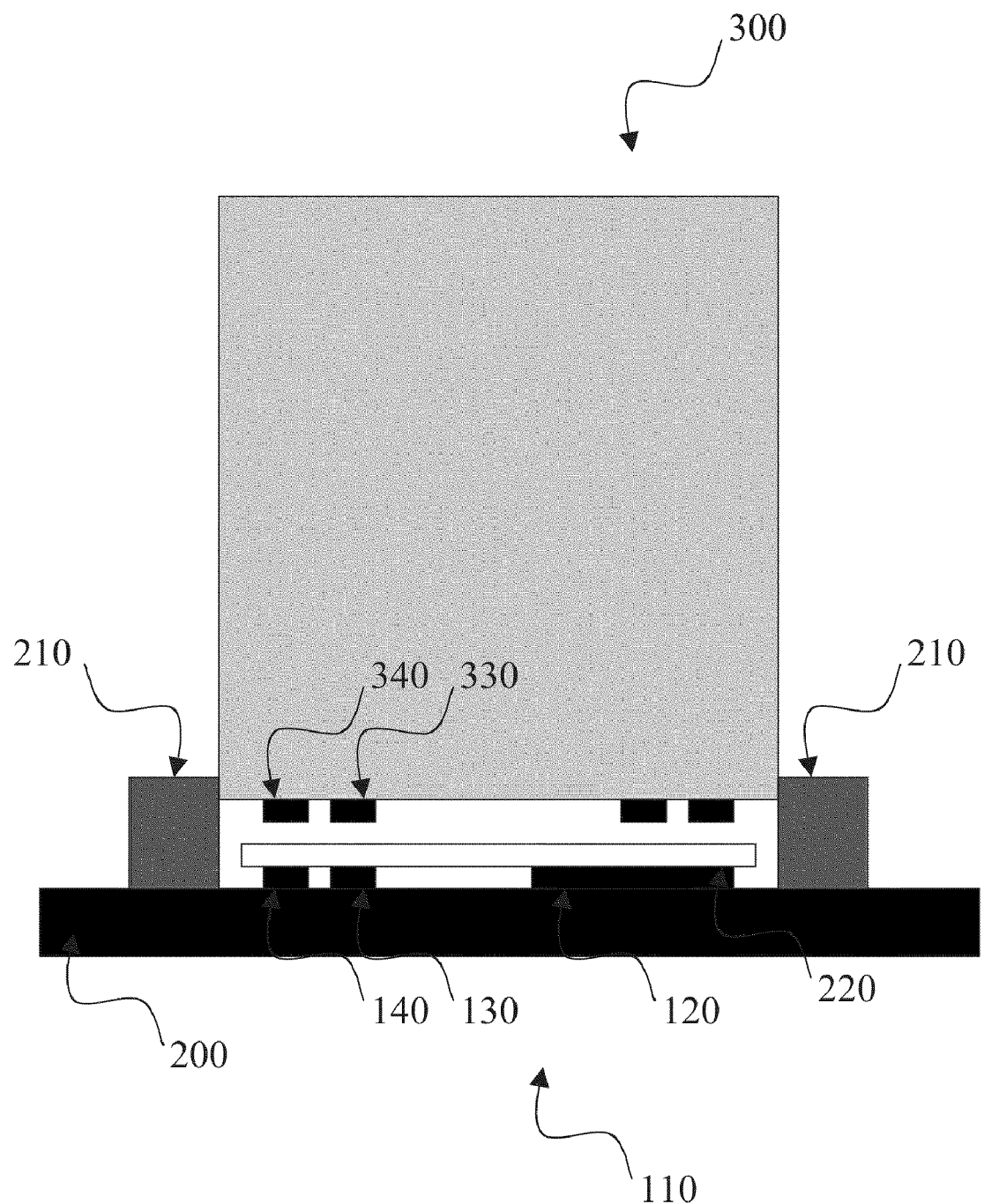
FIG. 4 depicts the relationship between a game piece and a sensor in the inventive system.
Figure 5:
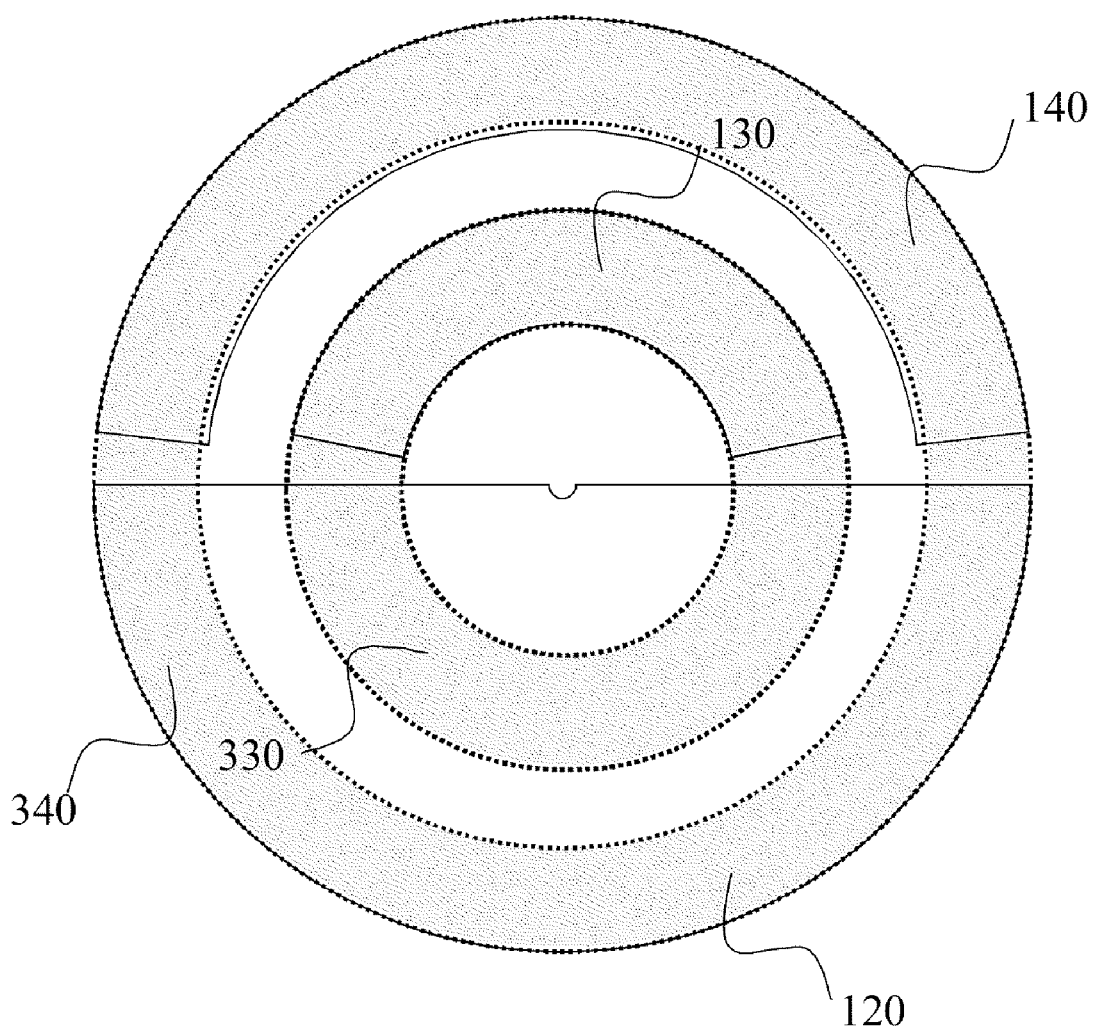
FIG. 5 shows a plan view of the relationship between a sensor and indicia in the inventive system.

FIG. 4 shows in greater detail the relationship between game piece 300 and sensor assembly 110 when determining the presence and identify of game piece 300 by the inventive method. Game piece 300 is placed by a player within ring 210, which confines it position over the location of sensor assembly 110. Indicia at locations 330, 340 are thereby brought into proximity with reference element 120 and sensor elements 130, 140, with a fixed spacing between indicia 330, 340 and elements 120, 130, 140 maintained by non-conductive shield 220. The relationship between indicia locations 330, 340 and sensor elements 120, 130, 140 is shown schematically in FIG. 5, which shows a schematic plan view of these elements to depict their spatial relationship. A conductive indicium at position 330 spans the gap between conductive reference element 120 and conductive sensor element 130, thereby modifying the capacitance measured between reference element 120 and sensor element 130; similarly, a conductive indicium at location 140 spans the gap between reference element 120 and sensor element 140, thereby modifying the capacitance measured between reference element 120 and sensor element 140. The presence or absence of indicia at locations 330, 340 will determine the capacitance measured by processor 150 when determining the identity of game piece 300. Because of the circular symmetry of indicia at locations 330, 340 and the positional relationship between indicia locations 330, 340 and sensor elements 120, 130, 140, the measured capacitance for each sensor element is independent of the rotation orientation of game piece 300.

While the embodiment portrayed in FIG. 4 uses a raised ring to confine the position of the game piece, alternative methods of positioning the game piece relative to the sensor may be employed. For example, the sensor assembly 110 may be emplaced in a circular depression in substrate 200, or a series of pins or posts might be substituted for raised ring 210, or magnets might be incorporated into substrate 200 underlying sensor 210 and into game piece 300. Any of these or other alternative methods could be employed to ensure that game piece 300 is disposed coaxially with sensor assembly 110 when determining the presence and identity of the game piece, without departing from the spirit and intention of the invention.

Processor 150 can measure the capacitance of the various sensor elements 130, 140, without requiring additional external switching circuitry, thereby reducing the complexity of system 100.

Figure 6:
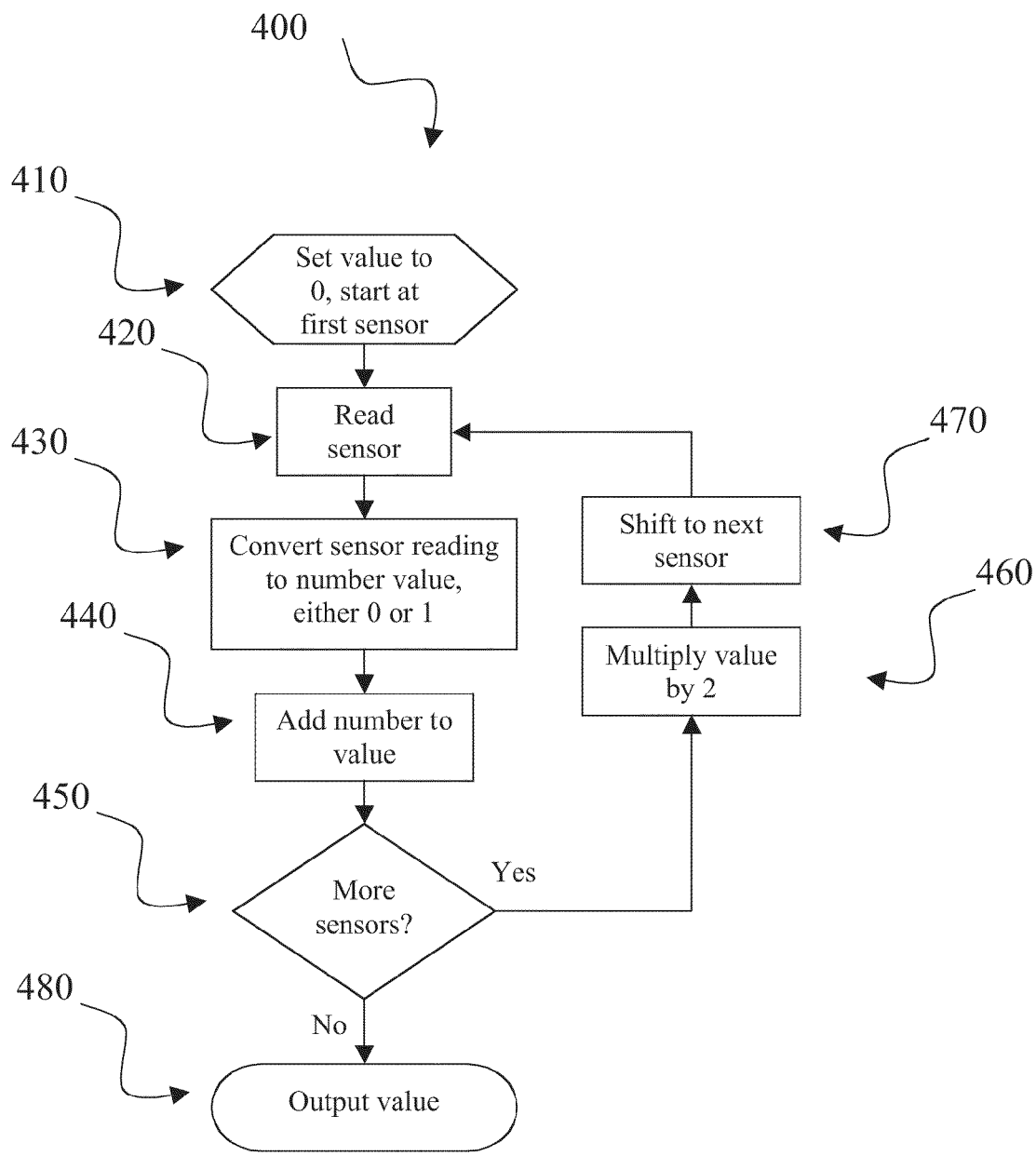
FIG. 6 shows a flowchart describing an exemplary procedure for reading a set of sensors and deriving a decoded numerical value.

FIG. 6 depicts an exemplary procedure 400 by which the identity of a game piece is determined. At a first step 410 the identity value is set to 0, and measurement starts at the first sensor. At a further step 420, the sensor is read. At a further step 430, the sensor reading is converted to a number, either 0 indicating the absence of an indicium at this sensor position, or 1 indicating the presence of an indicium at this position. The conversion at step 430 is made using calibration tables stored in data memory 170. At a further step 440 the number derived at step 430 is added to the identity value. At a further step 450 a test is made to determine if more sensors remain to be read. If more sensors remain to be read, at a further step 460 the identity value is multiplied by two. At a further step 470, the next sensor is selected, and processing continues at step 420. When all sensors have been read, at a further step 480 the identity value is output, signaling the identity of the game piece. Preferentially a game piece will have at least one indicium emplaced on the bottom surface, so that executing step 430, processor 150 will measure a 1 value for at least one sensor, thereby minimizing the chance of a false determination of the presence of a game piece. Thus, for a sensor assembly 110 with N sensor elements, the number of unique codes that can be differentiated is (2 raised to the N-th power) minus 1.

Figure 7:
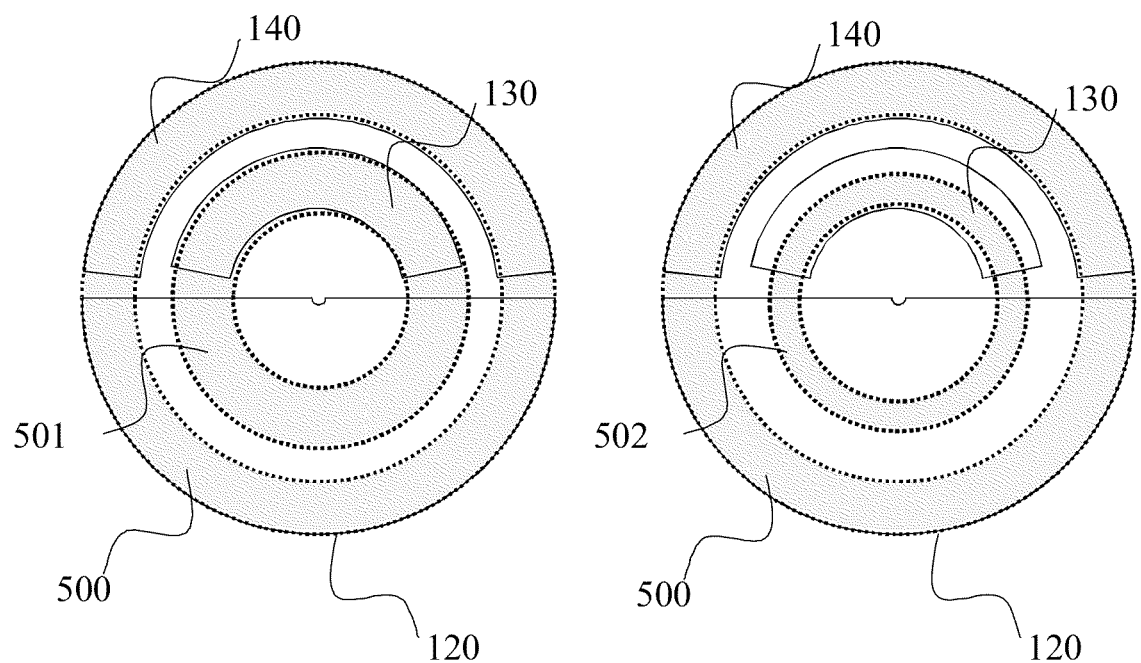
FIG. 7 shows an alternative embodiment using multiple indicia widths.

FIG. 7 depicts an alternative embodiment of the inventive system in which indicia of multiple sizes are used at fixed locations 330, 340 to encode the identity of a game piece. In the left panel, indicia of a first width 500, 501 are emplaced over the sensor elements 120, 130, 140. In the right panel, an indicium of a different width 502 is emplaced over sensor element 130. In this alternative embodiment, the identity of the game piece is determined by detecting both the presence and character of indicia. The use of indicia of multiple sizes allows for the differentiation of a greater number of unique codes, thereby reducing the number of sensor elements to differentiate among a fixed number of unique game pieces.

It will be apparent to one skilled in the art that the foregoing description of exemplary implementations is intended only to provide examples of the use of the invention, and is not a limitation upon the possible uses of the invention. Other similar embodiments could be designed or modified to utilize the features of this description without departing from the spirit and intention of this invention.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A method for encoding and decoding a numerical value on an game piece comprising:
    defining at least two concentric fixed positions on the game piece;
    placing an annular indicium over at least one of the at least two fixed positions; and
    decoding the numeric value on the game piece by placing the game piece over a sensor assembly with sensors underlying the at least two fixed positions, whereby the response of said sensors to said indicia is insensitive to the rotational orientation of the game piece over the sensor assembly, where said indicia are a number of conductive annuli of fixed width, said number being one or more, the sensors are capacitance sensors, and the numerical value is decoded by sensing the presence or absence of said indicia at the multiplicity of sensor locations, the number, width, and diameter of the conductive indicia representing the numerical value encoded on the game piece.

2. The method for encoding and decoding a numerical value on an game piece of claim 1 further comprising:
    decoding the numeric value on the game piece by placing the game piece over a sensor assembly with sensors underlying the at least two fixed positions, whereby the response of said sensors to said indicia is insensitive to the rotational orientation of the game piece over the sensor assembly.

3. The method for encoding a numerical value on an game piece of claim 1 further comprising:
    decoding the numeric value on the object by placing the game piece over a sensor assembly with sensors underlying the at least two fixed positions, whereby the response of said sensors to said indicia is insensitive to the rotational orientation of the game piece over the sensor assembly, where said indicia are conductive annuli with widths selected from a multiplicity of fixed widths, the sensors are capacitance sensors, and the numerical value is decoded by interpreting the magnitude of sensor responses at the multiplicity of sensor locations.

4. A gaming system comprising:
    one or more game pieces, each game piece including a substantially circular base;
    a number of annular indicium, said number being one or more, coupled to each substantially circular base to encode a numeric value for each game piece; and
    a gaming board, the gaming board including at least one sensor to couple to the substantially circular base of the game piece to detect the numeric value for the game piece, the sensor further comprising a capacitance sensor to detect the numeric value for the game piece based on at least the capacitance of the at least one annular indicium, the number, width, and diameter of the annular indicium encoded on the game piece.

5. The gaming system of claim 4, each annular indicium further comprising at least one conductive annular indicium.

6. The gaming system claim 4 further comprising a plurality of conductive annular indicia, each conductive annular indicium having substantially the same annular width.

7. The gaming system of claim 4 wherein the sensor is substantially insensitive to the rotational orientation of the game piece.

8. A gaming system comprising:
    a game piece having a substantially circular base with a number of annular indicia, said number being one or more coupled to each substantially circular base, the one or more annular indicia encoding a numeric value; and
    a gaming board configured to couple to the substantially circular base of the game piece, the gaming board with at least one sensor configured to detect the numeric value for the game piece, when the game piece is coupled to the gaming board, the numeric value for the game piece being detected based on the number, width, and diameter of the one or more annular indicia.

9. A method for encoding and decoding a numerical value on objects comprising:
    providing a game piece with a number of annular indicia, said number being one or more, placing each indicium over one of a plurality of fixed locations on the game piece, wherein each indicium is conductive and of fixed width;
    providing a sensor assembly, the sensor array with a plurality of capacitive sensors;
    placing the object over the sensor assembly with the plurality of capacitive sensors the plurality of fixed locations; and
    decoding the numeric value on the game piece by sensing the presence or absence of conductive indicia at the plurality of fixed locations by the capacitive sensors, the number, width, and diameter of the conductive indicia representing the numerical value encoded on the game piece.

* * * * *